United States Patent Office 2,950,294
Patented Aug. 23, 1960

2,950,294

SUBSTITUTED BENZENESULFONYL-HYDRAZONES (Q)

Hans Willi Zimmer, Cincinnati, Ohio, assignor to The Chattanooga Medicine Company, Chattanooga, Tenn., a corporation of Tennessee No Drawing. Filed July 1, 1958, Ser. No. 745,828

4 Claims. (Cl. 260—397.7)

The instant invention relates to novel organic compounds, and more particularly, to novel substituted benzenesulfonylhydrazones.

Although the compounds of the invention may have a number of uses in various fields, they may be found to be particularly useful as sun screen agents, foaming agents and chemotherapeutic agents. A desirable ingredient for "sun tan" lotions is a sun screen agent with high absorption of ultra-violet radiation in the neighborhood of 2970 A. (which wavelength produces undesirable reddening effect on the skin) and low absorption of light radiation in the neighborhood of 3400 A. (which wavelength produces the maximum tanning effect). The instant compounds possess such absorption spectral characteristics.

Also, the instant compounds may undergo decomposition upon melting and such decomposition is accompanied by the evolution of a large volume of gas, so that these compounds may be added to molten plastic or synthetic resin materials to act as foaming agents therefor.

In addition, the compounds of the invention may display anti-bacterial activity comparable to that of the well known sulfa drugs, sulfanilamide and sulfadiazine. In this respect, it should be noted that certain bacteria such as *Streptococcus pyogenes*, *Micrococcus pyogenes*, and *Escherichia coli* tend to become resistant to the known sulfa drugs, although they may be particularly sensitive to a new sulfa compound. It is believed that exposure of such bacteria to known sulfa drugs often tends to result in the survival of a strain resistant to such sulfa drugs, but still sensitive to a new sulfa drug to which the strain has not yet been exposed. There is thus a great need for new compounds which display anti-bacterial activity.

It is, therefore, an important object of the instant invention to provide new and useful substituted benzenesulfonylhydrazones.

It is another object of the instant invention to provide new and useful nitro-, amino- and acetamido-substituted benzenesulfonylhydrazones of certain ketone acids.

Yet another object of the instant invention is to provide new compounds useful as sun screen agents, foaming agents and/or chemotherapeutic agents.

Other and further objects, features and advantages of the present invention will become apparent to those skilled in the art from the following detailed disclosure thereof.

The instant invention consists in a compound selected from the group consisting of compounds having the formula:

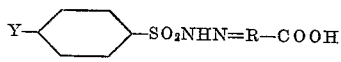

and metal salts thereof, wherein Y is a monovalent radical selected from the group consisting of —$NO_2$, —$NH_2$, and —$NHCOCH_3$ and R is a trivalent $C_4$—$C_7$ organic radical.

As indicated, the radical Y may be —$NO_2$, —$NH_2$, or —$NHCOCH_3$, so that the instant compounds are p-nitrobenzenesulfonylhydrazones, p-aminobenzenesulfonylhydrazones, or p-acetamidobenzenesulfonylhydrazones. In each case, these compounds are prepared by reacting a ketone acid with the corresponding substituted benzenesulfonylhydrazine.

In each case, the ketone acid employed contains at least one carboxylic acid group and at least one keto group. The ketone acid is a $C_5$—$C_8$ ketone carboxylic acid. Preferably, it is an aliphatic carboxylic acid. The radical R is a trivalent organic radical which contains from 4 to 7 carbon atoms. Preferably, it is an aliphatic hydrocarbon radical.

The compounds of the instant invention also include the various metal salts of the substituted benzenesulfonylhydrazones of the invention. The metal salt is formed with the carboxylic acid group in the instant compounds. The metal salt may be formed of a monovalent or a divalent metal; and preferably is formed of alkali metals such as sodium and potassium or divalent metals such as zinc and copper. Such salts are formed by first heating the substituted benzenesulfonylhydrazone in aqueous alcohol to dissolve the same and then introducing a metal ion donor, such as an alkali metal hydroxide, or, in the case of divalent metals having relatively insoluble hydroxides, introducing the metal ion in the form of a metal chloride.

Typical compounds of the invention include the following:

p-nitrobenzenesulfonylhydrazone of levulinic acid:

and the Na, K, Zn and Cu salts thereof.

p-nitrobenzenesulfonylhydrazone of gamma-propiobutyric acid:

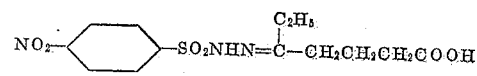

and the Na and K salts thereof:

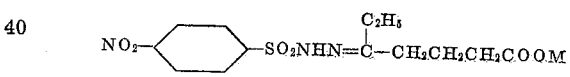

wherein M is Na or K.

p-nitrobenzenesulfonylhydrazone of delta-acetovaleric acid:

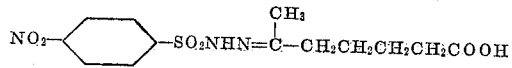

p-nitrobenzenesulfonylhydrazone of delta-propiovaleric acid:

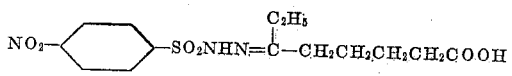

p-aminobenzenesulfonylhydrazone of levulinic acid:

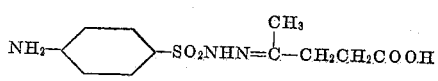

and the Na, K, Zn and Cu salts thereof.

p-aminobenzenesulfonylhydrazone of delta-propiovaleric acid:

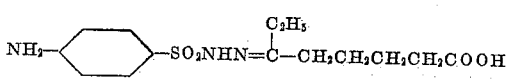

and the Na salt thereof:

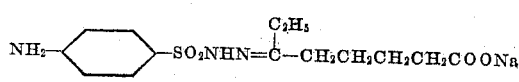

p-aminobenzenesulfonylhydrazone of epsilon-acetocaproic acid:

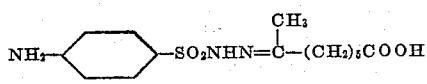

p-aminobenzenesulfonylhydrazone of gamma-propiobutyric acid:

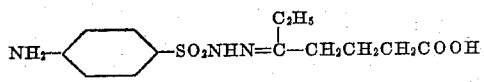

and the Na, K, Zn and Cu salts thereof.

p-acetamidobenzenesulfonylhydrazone of levulinic acid:

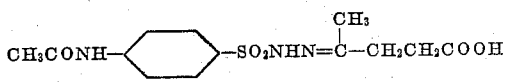

and the Na, K, Zn and Cu salts thereof.

p-acetamidobenzenesulfonylhydrazone of epsilon-acetocaproic acid:

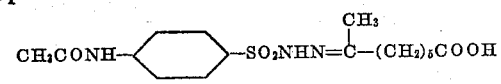

p-acetamidobenzenesulfonylhydrazone of gamma-propiobutyric acid:

and the Cu and Zn salts thereof.

p-acetamidobenzenesulfonylhydrazone of delta-acetovaleric acid:

The compounds of the instant invention are prepared by reacting the ketone carboxylic acid with corresponding p-nitro-, p-amino- or p-acetamidobenzenesulfonylhydrazine. The reaction is carried out advantageously in a solvent. The solvents preferably used are water, alcohol, dioxane, or mixtures of these. The substituted benzenesulfonylhydrazines are relatively insoluble in the solvents; so the reaction is facilitated by the application of external heat and stirring, so as to keep the hydrazine in suspension, if not solution. The hydrazine is first placed in a solvent and heated (with stirring); then substantially an equimolar quantity of the ketone carboxylic acid is added, usually a small amount at a time with continued stirring, until the reaction is completed as evidenced by a homogeneous appearance of the reaction mixture. The entire reaction period is but a few minutes (for example, 5 to 10 minutes). The product separates from the reaction mixture on cooling to room temperature and this product may be recrystallized from alcohol, water, dioxane or a mixture thereof, to yield a relatively pure product.

In the preparation of alkali metal salts of the instant compounds, the resulting hydrazone product is heated in aqueous alcohol to substantially dissolve the same, and with continued heating and stirring substantially an equimolecular proportion of the alkali metal hydroxide is added incrementally. After the addition of the alkali metal hydroxide is completed, the reaction mixture is cooled and the alkali metal salt product precipitates. This product may also be recrystallized.

In the preparation of a divalent metal salt, such as the zinc or copper salt of the instant hydrazones, the hydrazone is again heated in aqueous alcohol to substantially dissolve the same. Then with continued heat and stirring, a soluble salt of the particular divalent metal desired (such as zinc chloride or copper chloride) is added incrementally. This results in the formation of the corresponding zinc or copper hydrazone which precipitates.

Example 1 p-Acetamidobenzenesulfonylhydrazine (0.04 mol) is suspended with stirring in a mixture of 50 ml. of methanol and 50 ml. of water. The mixture is warmed to 80° C. and levulinic acid (0.04 mol) is added with continued stirring. The reaction mixture becomes homogeneous in a few minutes and precipitation of a solid from the mixture commences. The mixture is permitted to stand for two hours at room temperature and the precipitated solid is collected then on a suction filter. The product is dried in an oven at 95° C. and then recrystallized from 100 ml. of hot methanol. The resulting product is in the form of white crystals which melt with decomposition at 174–175° C. Analysis for p-acetamidobenzenesulfonylhydrazone of levulinic acid: Calculated for $C_{13}H_{17}N_3O_5S$ is $C=47.69$, $H=5.23$, $N=12.84$; and found: $C=47.78$, $H=5.25$, $N=12.76$.

The same procedure as that just described may be employed using, in place of the levulinic acid, other ketone carboxylic acids such as gamma-propiobutyric acid, delta acetovaleric acid and the like to produce the corresponding hydrazones.

Example 2

The p-acetamidobenzenesulfonylhydrazone of levulinic acid (0.02 mol) obtained in Example 1 is dissolved with heating in 800 ml. of methanol, 75 ml. of dioxane and 75 ml. of water. With continued heating and stirring, 10% aqueous sodium hydroxide (0.02 mol) is added, and the reaction mixture is permitted to cool, whereupon a precipitate is obtained as the sodium salt of p-acetamidobenzenesulfonylhydrazone of levulinic acid. Sodium salts of the other hydrazones mentioned in Example 1 may be obtained by carrying out the same procedure.

Example 3

The p-acetamidobenzenesulfonylhydrazone of levulinic acid (0.02 mol) obtained in Example 1 is dissolved with heating and stirring in a mixture of 800 ml. of methanol, 75 ml. of dioxane and 75 ml. of water. With continued heating and stirring, 10% aqueous copper chloride (0.01 mol) is added and the reaction mixture is allowed to cool with the formation of a precipitate which is copper salt of p-acetamidobenzenesulfonylhydrazone of levulinic acid.

Example 4 p-Aminobenzenesulfonylhydrazine (0.04 mol) is suspended with stirring in a mixture of 50 ml. of methanol and 50 ml. of water. The mixture is warmed to 80° C. and levulinic acid (0.04 mol) is added with continued stirring. The reaction mixture becomes homogeneous in a few minutes and precipitation of a solid from the mixture commences. The mixture is permitted to stand for two hours at room temperature and the precipitated solid is collected then in a suction filter. The product is dried in an oven at 95° C. and then recrystallized from 100 ml. of hot methanol. The resulting product is in the form of white crystals which melt with decomposition at 145–146° C. Analysis for p-aminobenzenesulfonylhydrazone of levulinic acid: Calculated for $C_{11}H_{15}N_3O_4S$ is $C=46.31$, $H=5.30$, $N=14.73$; and found: $C=46.25$, $H=5.35$, $N=14.56$.

The corresponding p-aminobenzenesulfonylhydrazones of delta-propiovaleric acid, gamma-propiobutyric acid, and the like are prepared using the corresponding ketone carboxylic acid in the instant procedure.

Example 5

The p-aminobenzenesulfonylhydrazone of levulinic acid (0.02 mol) obtained in the foregoing Example 4 is dissolved by heating in 800 ml. of ethanol, 75 ml. of dioxane and 75 ml. of water. With continued heating and stirring, 10% aqueous potassium hydroxide (0.02 mol) is added and the reaction mixture is permitted to cool with precipitation of the potassium salt of p-aminobenzenesulfonylhydrazone of levulinic acid.

Example 6

The p-aminobenzenesulfonylhydrazone of levulinic acid (0.02 mol) of Example 4 is dissolved by heating in 800 ml. of methanol, 75 ml. of dioxane and 75 ml. of water. With continued heating and stirring, 10% aqueous zinc chloride (0.01 mol) is added and the reaction mixture is permitted to cool with precipitation of the zinc salt p-aminobenzenesulfonylhydrazone of levulinic acid.

Example 7 p-Nitrobenzenesulfonylhydrazine (0.04 mol) is dissolved with stirring in a mixture of 50 ml. of methanol and 50 ml. of water. The mixture is warmed to 80° C. C. and levulinic acid (0.04 mol) is added with continued stirring. The reaction mixture becomes homogeneous in a few minutes and precipitation of a solid from the mixture commences. The mixture is permitted to stand for two hours at room temperature and the precipitated solid is collected then in a suction filter. The product is dried in an oven at 95° C. and then recrystallized from 100 ml. of hot methanol to obtain a product in the form of white needles melting with decomposition at 174–175° C. Analysis for p-nitrobenzenesulfonylhydrazone of levulinic acid: Calculated for $C_{11}H_{13}N_3O_6S$ is C=41.91, H=4.15, N=13.33; and found: C=42.08, H=4.22, N=13.55.

Example 8

The p-nitrobenzenesulfonylhydrazone of levulinic acid obtained in the previous example (0.02 mol) is dissolved in 100 ml. of hot methanol; and 10% aqueous sodium hydroxide (0.02 mol) is added with stirring; and the reaction mixture is permitted to cool with precipitation of the sodium salt of p-nitrobenzenesulfonylhydrazone of levulinic acid.

Example 9 p-Nitrobenzenesulfonylhydrazone of levulinic acid (0.02 mol) is dissolved with heating in 200 ml. of methanol. With continued stirring and heating, 10% aqueous zinc chloride (0.01 mol) is added; and the reaction mixture is permitted to cool with precipitation of the zinc salt of p-nitrobenzenesulfonylhydrazone of levulinic acid.

The compounds of the invention just described show peak absorptions of light radiation in the neighborhood of 2970 A. and low absorption of light radiation in the neighborhood of 3400 A., so that they may be used in sun tan lotions. The compounds also undergo decomposition upon melting. With respect to antibacterial activity, p-nitrobenzenesulfonylhydrazone of levulinic acid is effective against *Escherichia coli*.

It will be understood that modifications and variations may be effected without departing from the spirit and scope of the novel concepts of the present invention.

I claim as my invention:

1. A compound selected from the group consisting of a compound having the formula:

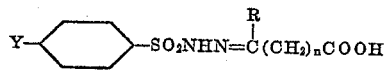

and sodium, potassium, zinc and copper carboxylic acid salts of the compound having said formula; wherein Y is a monovalent radical selected from the group consisting of —$NO_2$, —$NH_2$ and —$NHCOCH_3$, $n$ is an integer from 1 to 5, and R is selected from the group consisting of —$CH_3$ and —$C_2H_5$.

2. p-Acetamidobenzenesulfonylhydrazone of levulinic acid.

3. p-Nitrobenzenesulfonylhydrazone of levulinic acid.

4. p-Aminobenzenesulfonylhydrazone of levulinic acid.

References Cited in the file of this patent

Chemical Abstracts, vol. 41, pp. 5474–5477 (1947) [Abstract of Lehmann et al. Bull. Soc. Chim. Belges, vol. 55, pp. 52–97 (1946)].

Lehmann et al, Bull. Soc. Chim. Belges, vol. 55, pp. 66–68; 82–85; 89–92 and 94–96 (1946).